No. 705,921.
E. GRAHAM.
HEATING DRUM.
(Application filed Dec. 31, 1901.)
(No Model.)
Patented July 29, 1902.
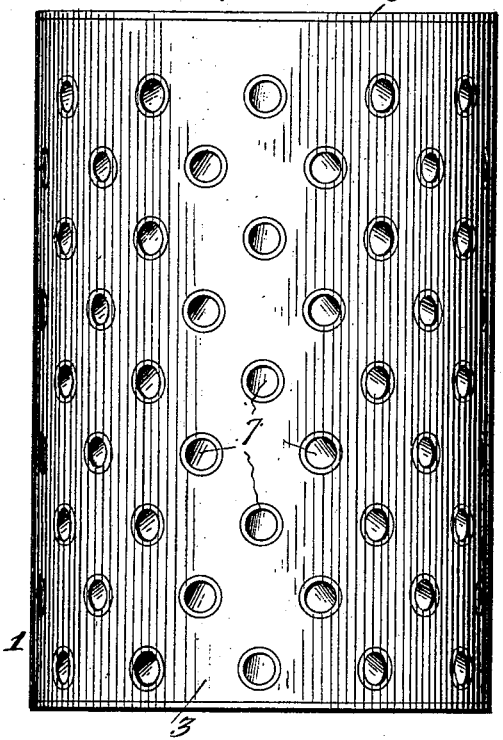
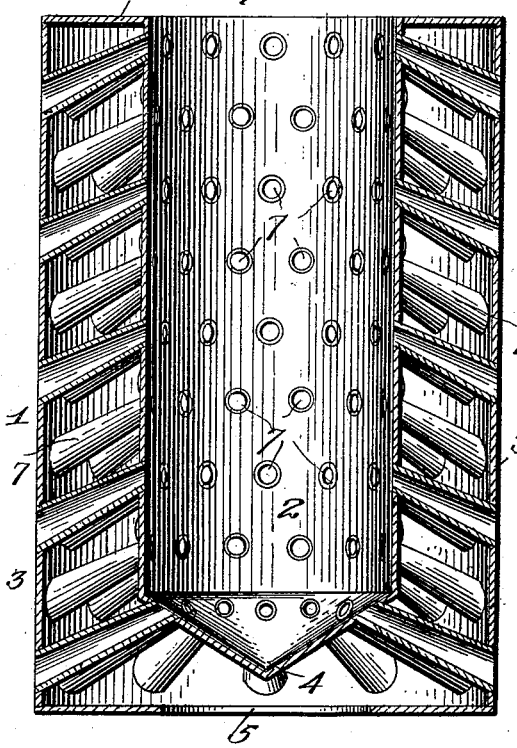
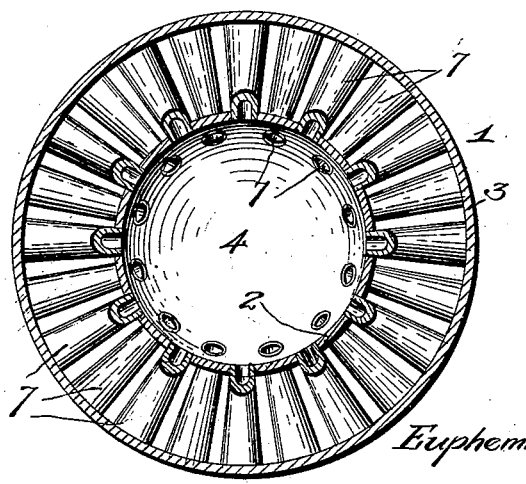
Inventor
Euphemia Graham

UNITED STATES PATENT OFFICE.

EUPHEMIA GRAHAM, OF CARROLL, IOWA.

HEATING-DRUM.

SPECIFICATION forming part of Letters Patent No. 705,921, dated July 29, 1902.

Application filed December 31, 1901. Serial No. 87,918. (No model.)

*To all whom it may concern:*

Be it known that I, EUPHEMIA GRAHAM, a citizen of the United States, residing at Carroll, in the county of Carroll and State of Iowa, have invented certain new and useful Improvements in Heating-Drums; and I do declare the following to be a full, clear, and exact description of the invention, such as will enable others skilled in the art to which it appertains to make and use the same.

The invention relates to heating-drums, and more particularly to that class of devices used in connection with gas and gasolene stoves.

The object of the invention is to provide a heating-drum which shall be simple of construction, durable in use, comparatively inexpensive of production, and efficient in action.

With this and other objects in view the invention consists of certain novel features of construction, combination, and arrangement of parts, which will be hereinafter more fully described and particularly pointed out in the appended claims.

In the accompanying drawings, Figure 1 is a side elevation of my improved heating-drum. Fig. 2 is a longitudinal vertical sectional view, and Fig. 3 is a horizontal sectional view.

Referring to the drawings, 1 denotes the heating-drum, consisting of the inner and outer shells 2 and 3, respectively, the former of which is arranged within the latter and spaced apart and closed at its lower end and formed with a point 4, which serves as a spreader or deflector. The outer shell at its lower end is provided with an aperture 5 directly below the pointed lower end of the inner shell, and both shells are connected at their upper ends by a ring 6, thus forming between the two shells a hot-air chamber from which the air cannot escape except by backing out through the opening 5, which is of course placed over the burner of the stove.

7 denotes a series of pipes which lead from the outer shell across the hot-air chamber and through the inner shell. These tubes are connected to the inner and outer shells in any suitable manner, so as to form an air-tight joint at the points of connection, and are preferably conical, the lower ends being of a greater diameter than the upper ends.

In use when placed over the flame of a burner the heat passes up into the chamber and not being able to escape at the upper end thereof intensely heats the tubes 7, through which cold air passes upwardly into the outer shell, which is also heated by the air confined within the hot-air chamber. Thus the air escaping through the upper open end of the inner shell becomes heated to a high degree of temperature, not only by passing through the tubes 7, but also by receiving heat from the inner wall of the inner shell. It will also be noticed that the outer shell will become heated to a high degree of temperature by reason of the heated air being confined within the same and that this shell will radiate heat from its sides.

From the foregoing description, taken in connection with the accompanying drawings, the construction, mode of operation, and advantages of the invention will be readily understood without requiring a more extended explanation.

Various changes in the form, proportion, and details of construction may be made within the scope of the invention without departing from the spirit or sacrificing any of the advantages thereof.

Having thus described my invention, what I claim, and desire to secure by Letters Patent, is—

1. A heating-drum consisting of concentric shells spaced apart, the outer shell being provided with an aperture at its lower end, and the inner shell being closed at its lower end and arranged immediately above said aperture, the upper ends of both of said shells being connected together by a ring to close the upper end of the chamber formed by the two shells, and open-ended tubes extending through said chamber and connected to said shells, substantially as set forth.

2. A heating-drum consisting of concentric shells spaced apart, the outer shell being provided with an aperture at its lower end and the inner shell having a closed conical lower end which is arranged immediately above said aperture, the upper ends of both of said shells being connected together by a ring which closes the upper end of the chamber formed by the two shells, and open-ended tubes extending through said chamber and connected to said shells, said tubes tapering from their outer to their inner ends at which latter point they are the smallest, substantially as set forth.

In testimony whereof I have hereunto set my hand in presence of two subscribing witnesses.

EUPHEMIA GRAHAM.

Witnesses:
J. E. GRIFFITH,
HELEN M. ALLEN.